(12) United States Patent
Hebb et al.

(10) Patent No.: US 8,301,707 B1
(45) Date of Patent: Oct. 30, 2012

(54) PREDICTIVE ELECTRONIC MAIL ADDRESSING

(75) Inventors: Lauriann L. Hebb, Port St. Lucie, FL (US); Jesse Kates, Kansas City, MO (US); Kristen Miller, Chicago, IL (US); Christine Denise Schumaker, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 125 days.

(21) Appl. No.: 12/568,708

(22) Filed: Sep. 29, 2009

(51) Int. Cl.
*G06F 15/16* (2006.01)
(52) U.S. Cl. .......................... 709/206; 709/226; 709/245
(58) Field of Classification Search .................. 709/206, 709/226, 245
See application file for complete search history.

(56) References Cited

U.S. PATENT DOCUMENTS

| | | | |
|---|---|---|---|
| 2004/0215726 A1* | 10/2004 | Arning et al. | 709/206 |
| 2008/0300944 A1* | 12/2008 | Surazski et al. | 705/8 |
| 2009/0077026 A1* | 3/2009 | Yanagihara | 707/3 |
| 2009/0100183 A1* | 4/2009 | Lam et al. | 709/229 |
| 2009/0210504 A1* | 8/2009 | Shuster | 709/206 |
| 2009/0282110 A1* | 11/2009 | Price et al. | 709/206 |
| 2010/0017478 A1* | 1/2010 | Mejia et al. | 709/206 |

* cited by examiner

*Primary Examiner* — Liangche A Wang
*Assistant Examiner* — Cheikh Ndiaye (57) ABSTRACT

A system for predictive electronic mail addressing is provided. The system comprises a computer system and an application, that when executed on the computer system, observes the instantiation of a draft electronic mail message on a client device. The system also analyzes at least one of an entry of a first addressee, an entry of text in the subject line, and an entry of text in the body of the draft electronic mail message. The system also identifies at least one list comprising a plurality of proposed addressees based on the analyzed entries. The system also displays the at least one list in a selection pane on the client device and enters the list into the addressee entry space of the draft electronic mail message when selected.

14 Claims, 6 Drawing Sheets

PREDICTIVE ELECTRONIC MAIL ADDRESSING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic mail messaging has become a widely used medium for business and social purposes. Much of the business world relies upon communications between people who are not physically in the same building, region, or country. Electronic mail has grown in popularity as arranging and attending in-person meetings, placing telephone calls, or participating in conference calls can be inconvenient, time-consuming, and costly. Electronic mail provides a vehicle for exchange of information with low startup costs and maintenance costs that may be far less than those for physical meetings or phone calls. One person can use electronic mail to communicate with a plurality of addressees and may communicate a large volume of information to a geographically dispersed group of addressees in a very short time at very low cost. In addition to text content, a sender may embed graphic, video, and audio files as well as attach computer files to a message. In a large organization, an individual responsible for a specific project may keep a large number of persons informed on the progress of the project by distributing electronic mail updates as new information becomes available. The ability to send and receive electronic mail messages using mobile devices has further expanded the reach of the medium.

SUMMARY

In an embodiment, a system for predictive electronic mail addressing is provided. The system comprises a computer system and an application, that when executed on the computer system, observes the instantiation of a draft electronic mail message on a client device. The system also analyzes at least one of an entry of a first addressee, an entry of text in the subject line, and an entry of text in the body of the draft electronic mail message. The system also identifies at least one list comprising a plurality of proposed addressees based on the analyzed entries. The system also displays the at least one list in a selection pane on the client device and enters the list into the addressee entry space of the draft electronic mail message when selected.

In another embodiment, a processor-implemented method for predictive electronic mail addressing is provided. The method comprises a predictive addressing server observing the entry of a first addressee in a first draft electronic mail message on a client computer. The method also comprises the predictive addressing server observing the entry of a first keyword in the message body of the first draft electronic mail message. The method also comprises the predictive addressing server determining a first probability based on the percentage of historic electronic mail messages addressed to the first addressee wherein the first keyword appears in the body of each historic electronic mail message at least one time. When the first probability exceeds a first predetermined minimum, the method also comprises the predictive addressing server determining a second probability based on the percentage of historic electronic mail messages including the first addressee and the first keyword wherein a first collection of additional addressees was also included as addressees in the historic electronic mail messages. When the second probability exceeds a second predetermined minimum, the method also comprises the predictive addressing server displaying the first collection of additional addressees in a pop-up window and adding the first collection of additional addressees to the first addressee displayed in the first draft electronic mail message. The method also comprises the predictive addressing server inserting the first collection of additional addressees when selected.

In another embodiment, a processor-implemented method for predictive electronic mail addressing is provided. The method also comprises a predictive addressing server observing the entry of a first addressee and the entry of at least one of subject line text and message body text in a first draft electronic mail message on a client computer. The method also comprises the predictive addressing server determining that the entry of a second addressee in one of the Copy To field and the Blind Copy To field of the first draft electronic mail message is required by the entry of the first addressee in the first draft electronic mail message. The method also comprises the predictive addressing server observing the entry of an instruction on the client computer invoking the sending of the first draft electronic mail message. The method also comprises the predictive addressing server stopping transmission of the first draft electronic mail message. The method also comprises the predictive addressing server entering the second addressee in one of the Copy To field and the Blind Copy To field of the first draft electronic mail message. The method also comprises the predictive addressing server releasing the first draft electronic mail message for transmission.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a predictive electronic mail addressing system permit an application to observe in progress composition of a draft electronic mail message by a sender, analyze a plurality of previous messages sent by the sender, predict the likelihood of the need for specific additional addressees to be inserted into the draft message based on the analysis, and present likely additional addressees to the sender for review and possible insertion into the draft message. As a sender enters addressees, subject line text, and message body text into a draft message, the system dynamically searches a database for previous messages sent by the sender that contain combinations of the same addresses and/or text items. The system also may perform searching of electronic message databases and statistical analysis of the frequency of association of email addresses and groups of email addresses in advance of a sender drafting a message. The system calculates probabilities that the sender may wish to include various additional addressees or collections of addressees in the draft message based on the frequency of the observed items in the previous messages. When calculated probabilities exceed predetermined thresholds, the system presents at least one list of proposed addressees to the sender in a pop-up window or dialogue box. The sender has the option to select or decline the proposed additional addressees for insertion into the draft message.

A user of an electronic device in an organizational setting may send electronic mail messages to the same collection of addressees with the same or very similar subject line message over a short period. A user may intend to include, for example, the same five individuals as primary addressees and three other individuals as Copy To addressees in all electronic mail messages about a certain matter over a five week period until the matter is closed. A user working on a project team or in a crisis management unit handling specific tasks wherein visibility within the organization and perhaps with customers or other external parties is high may wish to take considerable care in including addressees in electronic mail messages about project status or next action steps in a crisis. Often, these messages are distributed to many of the same addressees.

Portions of the subject line and some or all of the message body text also may be the same in the messages. The frequent occurrence of these elements and the addressees is central to the analysis and prediction taught by the present disclosure. In a crisis management case for a customer technical support organization, for instance, a critical situation may last six weeks until it is resolved. During that six week period, a member of a crisis management team handling the case may distribute an electronic mail message several times per day to many of the same addressees. If the crisis is serious and involves high customer visibility, senior personnel may be included as addressees. There may be consequences of inadvertently omitting a senior manager or officer from a key electronic mail message.

The present disclosure teaches a system and methods for predicting and alerting a user when a draft electronic mail message that contains one or more addressees, subject line text, and/or message body text items may likely need to contain additional addressees. The present disclosure also teaches the mandatory placement of one or more additional addressees or groups into the Copy To field and/or the Blind Copy To field of a draft message based on a rule or policy. An organization may have instituted a rule that requires certain parties to be automatically entered as copy recipients or blind copy recipients based on the observed entry of one or more addressees, subject line items, and/or message body items into a draft message. Such rules may be in place for management or disciplinary reasons regarding the sender or senders of some electronic mail messages. Rules may be designed to protect an organization from legal liability or for compliance with regulations or contractual obligations.

Figure 1:
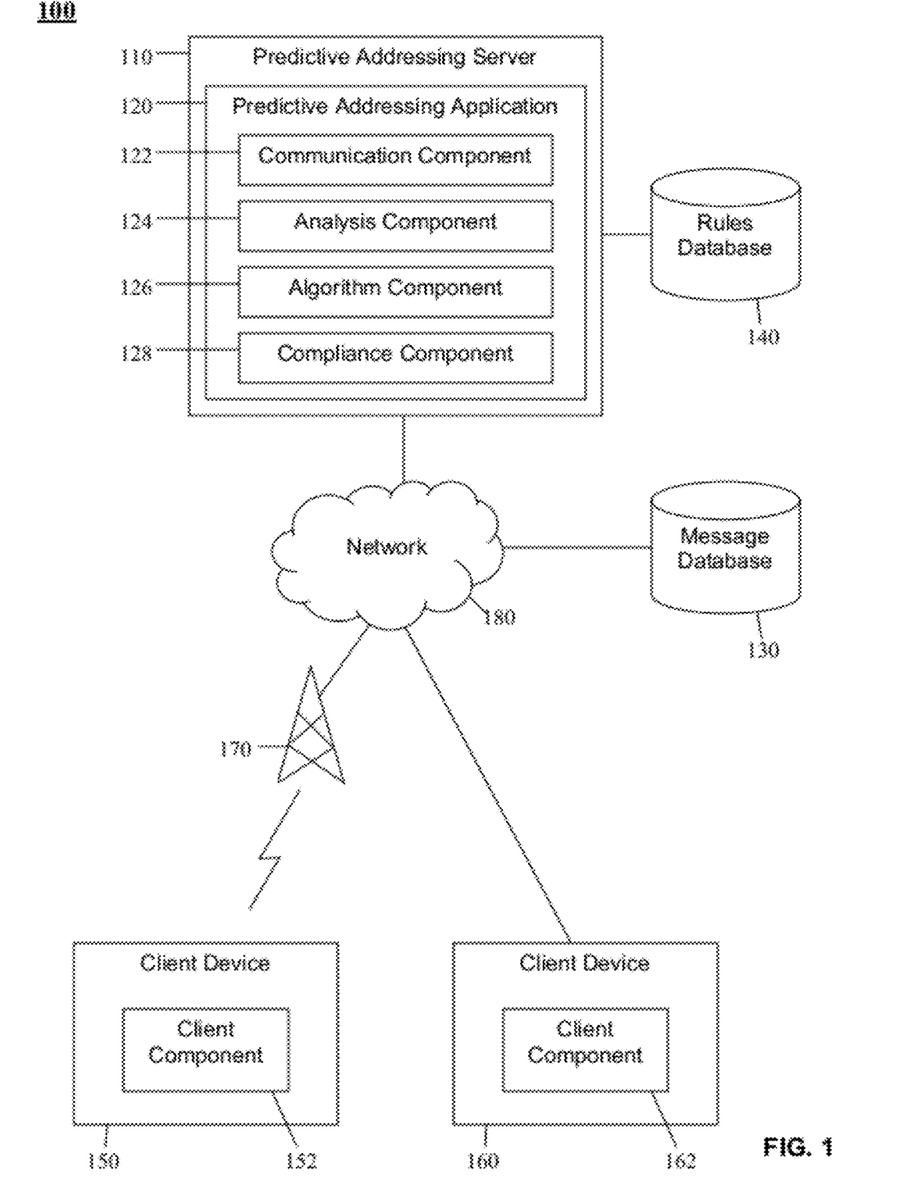
FIG. 1 is a block diagram of a system according to an embodiment of the disclosure.

Turning now to FIG. 1, a system 100 of predictive electronic mail addressing is provided. The system 100 comprises a predictive addressing server 110, a predictive addressing application 120, a message database 130, a rules database 140, client devices 150, 160, client components 152, 162, a base transceiver station 170, and a network 180.

The predictive addressing application 120 receives a message from the client component 152 executing on the client device 150 advising that a draft electronic mail message has been instantiated on the client device 150. The client component 152 advises the predictive addressing application 120 of specific items being entered into the draft message including electronic mail addresses and text into the subject line and body of the draft message. The predictive addressing application 120 examines previous electronic mail messages sent by the client device 150 stored in the message database 130. The predictive addressing application 120 searches for previous sent messages that contain at least one of the items presently entered into the draft message by the client device 150. When a significant proportion of previously sent messages contain at least one of or combinations of the same addressees, same items of subject line text, and/or same items of message line text as are being entered into the draft message, the predictive addressing application 120 calculates the probability that the user currently creating the draft message may wish additional addressees to be entered in the To line, the Copy To line, and/or the Blind Copy To line of the draft message. The predictive addressing application 120 also may suggest or require the addition of some addressees based on rules stipulated in the rules database 140 or elsewhere.

The predictive addressing application 120 may then, based on the observations and its calculations, create proposed groupings of additional addressees and present the proposed groupings together in list form in a pop-up or similar window on the client device 150. The user of the client device 150 views the list and may choose to add one or more of the proposed groupings of additional addressees into an address space of the draft electronic mail message. The user of the client device 150 also may selectively choose individual addressees from within lists of displayed groups for inclusion in draft messages.

The predictive addressing server 110 may be a computer system. Computer systems are discussed in greater detail hereinafter. The predictive addressing server 110 may comprise one computer or a plurality of computers, for example, a server farm wherein many server computers cooperate to share a processing load. The predictive addressing server 110 may comprise a plurality of computers that are located at different places, for example, to provide geographical diversity and increased service reliability. The predictive addressing server 110 executes one or more applications that provide services including the predictive addressing application 120.

In an embodiment, the predictive addressing server 110 may be the same computer system upon which an electronic mail server or messaging application resides that provides messaging services to a plurality of client devices 150, 160.

The predictive addressing application 120 executes on the predictive addressing server 110 and provides a variety of electronic mail addressee prediction, presentation, and alert services. The predictive addressing application 120 communicates with client components 152, 162 executing on a plurality of client devices 150, 160, respectively, receives reports about information entered into draft messages at client devices 150, 160, and predicts and presents additional addressees based on calculated probabilities associated with the entered information, the calculated probabilities based on analysis of information contained in previously sent electronic mail messages. The predictive addressing application 120 also may present additional addressees based on rules stipulated in the rules database 140 or elsewhere. The present disclosure teaches a system and methods that may relieve a user of a client device 150 from the need to create and maintain predefined aliases and groups for use in drafting electronic mail messages. The tasks supporting the use of aliases and groups can be time consuming and problematic in terms of building, updating, and deleting the individual names included in aliases and groups and may not be worth the time and effort required. Additionally, since electronic mail messages may be sent from portable electronic devices and other devices with small user interfaces and small keyboards, the system and methods taught herein may relieve a user of the additional complications and risks that may arise from entering data into devices that use such limited form factors.

The predictive addressing application 120 comprises the communication component 122 that exchanges messages with the client components 152, 162 executing on client devices 150, 160 about electronic mail messages currently being drafted by client devices 150, 160. When a new draft electronic mail message is opened on a client device 150 and the associated user begins entering information, the communication component 122 receives a message from the client component 152 providing notice of this event and alerting the communication component 122 that it may shortly receive information about addressees and other data entered into the draft message on the client device 150. The receipt of this notice from the client component 152 by the communication component 122 may cause the predictive addressing application 120 to create a workspace that it may associate with the current draft message. The notice received by the communication component 122 alerts it that the predictive addressing application 120 may need to establish a session with the message database 130 to access electronic mail messages previously sent by the client device 150. The notice also may alert the communication component 122 that the other components of the predictive addressing application 120 may need to be activated as they may shortly be called on to begin processing.

When addressee and other information are entered into the draft message at the client device 150, the communication component 122 receives transmissions from the client component 152 containing this information. The communication component 122 may receive these items of information individually in real time as they are detected and sent by the client component 152 or it may receive multiple items of information in a batch transmission. As it receives the addressee and other inserted information presently being entered into the draft message, the communication component 122 provides the information to the other components of the predictive addressing application 120 for their analysis and possible prediction of additional candidate addressees. As the listings of proposed groupings of addressees are subsequently created by the other components of the predictive addressing application 120, the communication component 122 sends these to the client component 152 that presents them for review by the user of the client device 150 and possible selection for insertion into addressee lists of the draft message.

During the drafting of an electronic mail message, the communication component 122 may engage in a series of communications exchanges with the client component 152. As addressees and other information are entered into the draft message, the communication component 122 receives the items of information and submits them to the other components of the predictive addressing application 120 for analysis and further prediction. With each additional item of information received and processed during the monitored drafting of the message, the predictive addressing application 120 may perform a more comprehensive and informed analysis of the received items currently entered into the draft message vis-à-vis combinations of the same or similar items appearing in previously sent messages. While a message is being drafted on the client device 150, the communication component 122 may receive a plurality of information transmissions from the client component 152, may pass the items of information to the other components of the predictive addressing application 120 for analysis, may receive multiple proposed addressee lists in reply, and may send the lists back to the client component 152 in one or a plurality of transmissions. The cycle of these steps may be repeated numerous times during the observed drafting of a single electronic mail message as additional information entered into the draft message is received and analyzed. For example, as a subject line and/or message body is being composed, the cycle of these steps could be repeated as information is received by the predictive addressing application 120.

In an embodiment, the communication component 122 also may send messages to client components 152, 162 executing on the client devices 150, 160, the messages containing requirements instead of suggestions for the insertion of specific addressees into some draft electronic mail messages. Components of the system 100 may examine some addressees and other information inserted into draft messages and determine that at least one policy may be invoked requiring the insertion of one or more specific electronic mail addresses. The communication component 122 sends these instructions to the client component 152 as required by the system 100. A policy may require, for example, that electronic mail messages created by users in a department that include the term "staff meeting" in the subject line also include the director of the department as an addressee in the Copy To line of the messages. The electronic mail address of the director would be automatically inserted into the Copy To line of all such electronic mail messages.

The predictive addressing application 120 also comprises the analysis component 124 that examines previously sent electronic mail messages stored in the message database 130. The analysis component 124 seeks to identify patterns of associations of addressees, subject line text items, and message body text items in the sent messages of individual client devices 150, 160. When the analysis component 124 receives notice from the communication component 122 that a draft message is currently being created by a particular client device 150, the analysis component 124 begins searching the message database 130 for previously sent messages by the client device 150.

The analysis component 124 in examining previously sent electronic mail messages examines combinations of entries made in a plurality of sent messages in determining whether to propose additional addresses or groups of addresses. The analysis component 124 may examine two data points in its analysis. The first data point may be a first addressee entered into the draft message and the second data point may be a second addressee. Based on the entries of the first and second addressees, the predictive addressing application 120 may propose the entry of additional addressees. The analysis component 124 may alternatively examine the entries of a first addressee and a string of text entered into the subject line of the draft message.

The analysis component 124 also may examine the entries of a first addressee and a string of text into the body of the draft message. The analysis component 124 also may examine the entries of a string of text into the subject line and a string of text into the body of the draft message. The present disclosure teaches the analysis component 124 of the predictive addressing application 120 recognizing combinations of entries of addressees, text items into draft message subject lines, and text items into draft message bodies and performing multiple analyses on the entries to determine associations that may support suggestions of additional addressees into the draft electronic mail message.

The analysis component 124 searches for previously sent messages that included at least one of the same addressee and/or keywords or portions of text in the subject line or message body as the message currently being drafted. While the draft message is being created, the analysis component 124 may dynamically be fed items of information by the communication component 122 as they are received from the client component 152. The analysis component 124 may insert each item of information as it is received into statistical models it may use that contain historical sent message information, elements, and associations. With each item of input received from the communication component 122, the analysis component 124 may be able to identify a larger and more statistically significant body of associations among addressees and other items contained in previous sent messages. As the analysis component 124 may further identify greater frequencies of certain associations with certain addressees, the predictive addressing application 120 may more accurately predict and propose additional addressees as a draft electronic mail message is observed being created on a client device 150. As an additional factor, the analysis component 124 may examine its previously predicted and proposed additional addressees in given situations and determine the proposed additional addressees that were accepted and how often.

The present disclosure teaches the analysis of sent electronic mail messages of client devices 150, 160 independently of each other. The analysis component 124 identifies associations of addressees and other inserted items for the client device 150 independent of the sent message history of the client device 160. In an embodiment, the analysis component 124 may analyze the sent message histories of some client devices 150, 160 in combination. The analysis component 124 also may analyze the sent message histories of specific users logged into client devices 150, 160 in combination.

The analysis component 124 in its review of sent electronic mail messages by a client device 150 and identification of associations of addressees, subject line text, and message text items may make note of associations that occur frequently and in recent days, weeks, or months. The analysis component 124 may build statistical probability models based on observed frequencies and associations of addresses and other items of information. In an embodiment, the analysis component 124 may search the message database 130 in advance, perform statistical and other analysis, and prepare some tentative conclusions on an anticipatory basis. The analysis component 124 may need to consult this information prepared in advance on short notice as a sending client device 150 may hurriedly create and send an electronic mail message. There may not be adequate time for the analysis component 124 to receive information from the communication component 122, create and send queries to the message database 130, determine associations of addressees and other information items, calculate probabilities, and send proposed addressees back via the communication component 122 to the client component 152.

Because of the potentially time-consuming character of database querying and the processor-intensive nature of determining associations and calculating probabilities of the need for inclusion of additional addressees arising from observed entries into draft messages, the analysis component 124 may perform its tasks at times when a draft message is not in process and the predictive addressing application 120 is not actively performing operations. The predictive addressing application 120 and the client devices 150, 160 may be better served by the analysis component 124 performing database search, analysis, identification of associations, and probability calculations beforehand so that much of the necessary processing may be complete and predictive capacity in place at the time a client device 150 begins drafting an electronic mail message. The value of the analysis component 124 performing tasks in advance of need may be particularly well supported by the inclusion of results regarding previous acceptance by client devices 150, 160 of suggestions based on analysis performed in advance. In some embodiments, the predictive addressing application 120 may only use the data generated in advance to make suggestions of additional addressees in live environments and may then periodically supplement the data generated in advance with empirically generated data from actual user acceptance and rejection of suggestions.

The analysis component 124, in searching the message database 130 for previously sent electronic mail messages containing specific items found in a draft message, may search for text items that may comprise contiguous or non-contiguous strings of alphanumeric characters. In an embodiment, the searched for text may be keywords or unusual words, terms, acronyms, numbers, proper names, or other strings of characters or symbols repeatedly observed in previous messages. A series of electronic mail messages sent to the same four individual addressees over a three week period also may frequently contain an error code, an address, and a serial number, for example. The analysis component 124 would note the frequency of occurrence of those character strings and make the character strings part of its analysis. If a sending client device 150 begins a new draft message, inserts three of the addresses but omits the fourth addressee and inserts the error code or other character string that always appears in recent messages sent to the four addressees, the analysis component 124 may likely note the exclusion of the fourth addressee and suggest the fourth addressee to the client device 150 as an additional addressee.

The analysis component 124 may employ a keyword search engine to scan and parse a plurality of electronic mail messages for specific keywords, unusual words, names, or combinations of words, numbers, or other characters. In an embodiment, the present disclosure also teaches the observation and analysis of electronic files embedded into electronic mail messages by client devices 150, 160, for example a file that displays a certain image when the message containing the file is opened or plays a certain video clip or short sound bite.

The analysis component 124 also may note and consider as a factor in its analysis the repeated attachment of files to messages sent to the same addressees wherein the name of the attached file is always the same or close to the same with only several characters changed in the name of the attached file. The analysis component 124 also may make note of and save for analysis entries repeatedly made using a distinctive font different from that used for the other portions of a message body. The analysis component 124 may search for characteristics and attributes of included content inserted into or attached to electronic mail messages and not just the text portion of the inserted content itself.

The predictive addressing application 120 also comprises the algorithm component 126 that subjects the statistical output of the analysis component 124 to additional processing steps before a final determination is made about presenting addressees to the client device 150 for possible insertion into a draft electronic mail message. While the analysis component 124 analyzes combinations of addressees and information items found in sent messages and may calculate statistical probabilities that a draft message containing some of those addressees and items may need to contain certain additional addressees, the algorithm component 126 applies criteria to the calculated probabilities and other output to determine the additional addressees that should be suggested to the client device 150. The algorithm component 126 may process probabilities determined by the analysis component 124 through mathematical formulae or algorithms to determine whether probabilities calculated by the analysis component 124 are statistically significant. The determination of whether a certain addressee or group of addressees may belong in an electronic mail message may involve conditional dependencies and may require the algorithm component 126 to apply more than a single criterion in one operation.

The algorithm component 126 may receive output from the analysis component 124 advising that a draft message presently being prepared by the client device 150 contains a first addressee and a first keyword in the subject line. The output may, for example, estimate that based on the presence of these two items, the probability that a group of four additional addressees should be placed in the Copy To portion of the message is 70%. The algorithm component 126 may need to examine the elements of that 70% calculation to determine the statistical significance of the finding including the total percentage of all messages sent by the client device 150 that included the first addressee and further, the percentage of that number that contained the other four addressees. The 70% total calculation is based on these two subcomponents.

The algorithm component 126 will examine the distribution of those messages across a span of time, for example the last ninety days, to determine if the messages were sent evenly over the time period, were clustered in a three week period two months ago, for example, or all occurred within the last week. Depending on these findings, the algorithm component 126 may decide that the 70% calculation is adequate to recommend adding the additional addressees or not adequate. The algorithm component 126 will make determinations about how more nuanced and sophisticated criteria are to be applied to calculations made by the analysis component 124. The algorithm component 126 makes adjustments to criteria and thresholds applied to probability calculations made by the analysis component 124 based on subjective input that is outside the scope and analytical capacity of the analysis component 124. The algorithm component 126 may apply heuristic or non-statistical techniques to output sent by the client component 152 to effectively make informed guesses beyond the purview of the analysis component 124. The algorithm component 126 may decide to raise or lower a threshold for a certain probability calculated by the analysis component 124 based on the overall sample sizes observed by the analysis component 124, the clustering of messages over an observed time period, and the length of the observed time period.

The algorithm component 126 may apply additional criteria to output generated by the analysis component 124. The algorithm component 126 may draw information from the rules database 140 that mandates the application of specialized processing rules, policies, or steps for one client device or a group of client devices 150, 160. Such policies may be in place due to the job description, security clearance, compensation level, or other specific attribute of the user or users of the client devices 150, 160. While the analysis component 124 may calculate statistical probabilities based on empirical observations, the algorithm component 126 may apply specialized policies, rules, algorithms, and non-quantitative measures to statistically derived output.

In an embodiment, the algorithm component 126 may determine based on output received from the analysis component 124 as well as application of its own criteria that more than one grouping of additional addressees should be proposed to the client device 150. Because determinations may be based on partial information entered into a draft message and because recommendations to the client device 150 may need to be made quickly because the client device 150 may be in a hurry, the algorithm component 126 may present several possible combinations of additional addressees to the client device 150 in the same pop-up window or dialogue box with the client device 150 given the opportunity to select one of the groupings of additional addressees or even select additional individual addressees from the presented combinations.

If the algorithm component 126, with the assistance of the client component 152 that is resident on the client device 150, detects that a draft electronic mail message is being prepared in rapid or haphazard fashion and may be at risk of being sent without a key additional addressee, it may employ shortcuts that circumvent the activity of the analysis component 124 and permit an expedited solution. Based strictly on the insertion of a first addressee or a commonly observed keyword in a subject line and the observation that a second addressee is almost always included with the first addressee when the observed keyword is present, the algorithm component 126 may propose the second addressee without the input of the analysis component 124, particularly if previous messaging activity involving the addressees is concentrated and recent. In an embodiment, the predictive addressing application 120 may propose the inclusion of addressees based on a single input of a first addressee, a first text item in a subject line or message body, or an embedding of an electronic file into the electronic mail message. The predictive addressing application 120, as an alternative to proposing an additional addressee and waiting for the user of the client device 150 to make a decision about insertion, may instead insert the proposed additional addressee and allow for the user to delete it.

The predictive addressing application 120 also comprises the compliance component 128. While discussion of the present disclosure has centered on the suggestion of proposed additional addressees based on observed addressees in draft electronic mail messages, the present disclosure also teaches the mandatory inclusion of an addressee based on items detected in the subject line and/or the body of a draft message. The compliance component 128 detects the entry of certain addressees, keywords, or other text items in the subject line or message body of electronic mail messages and enforces requirements contained in one or more policies. An organization may enforce policies that require certain addressees to be inserted into a draft message upon the placement of a specific addressee or text item in the draft message. Draft messages that are addressed to certain customers may by policy be required to also contain the electronic mail address of the officer or senior manager at the sending organization responsible for the account of the customer. This may be required for customer care reasons or for legal reasons. If a message is sent to an official of a government regulatory body, a policy may require that certain individuals in the sending organization are Copy To or Blind Copy To recipients, for example.

The client components 152, 162 executing on the client devices 150, 160 send information regarding addressees, text items, attachments, and embedded files to the predictive addressing application 120 when the information is entered into draft electronic mail messages at the client devices 150, 160. As the communication component 122 receives the information from the client components 152, 162, the compliance component 128 scans the information and may draw policies from the rules database 140 to determine if the inclusion of one or more addressees and/or items of text trigger the mandatory insertion of one or more additional addressees. The insertion of the additional addressees may be automatic and may not be apparent to users of the client devices 150, 160.

The compliance component 128 in its review of addressees, text items, attachments, and embedded media in draft electronic mail messages, may encounter items considered potentially harassing, obscene, offensive, or otherwise objectionable. The compliance component 128 may access policies contained in the rules database 140 about the inclusion of such potential objectionable content. The compliance component 128 in compliance with policies may insert additional addressees into the Blind Copy To sections of messages that contain such content. This action may support the taking of disciplinary or corrective action by managers. The compliance component 128 may assist in the protection of a large organization from legal risks that may arise from the inclusion of such objectionable content in electronic mail message. The detection of other text items in draft messages may assist in litigation, antitrust, and other legal matters.

The message database 130 contains copies of electronic mail messages previously sent by client devices 150, 160. The message database 130 is accessed by the analysis component 124 to determine patterns of associations of items contained in sent messages. The message database 130 may be associated with an electronic mail system (not shown) that manages the transmission of electronic mail messages within and beyond an organization. The message database 130 may be a subset of the general sent messages database (not shown) of an electronic mail system wherein the messages in the message database 130 are only those aged ninety days or less, for example.

The rules database 140 is associated with the predictive addressing server 110 and contains rules or policies used by the predictive addressing application 120 to assist in the determination of additional addresses to be proposed or mandated for insertion into draft electronic mail messages. The algorithm component 126 may consult rules in the rules database 140 that require the algorithm component 126 to apply certain rules or thresholds in its determinations of any additional proposed addresses to present to a client device 150 drafting a message. Rules may be enforced that affect the messages sent by certain client devices 150, 160 or those that are sent to certain addressees or those containing certain keywords or combinations of any or all of these keywords or addressees. Rules may be applied by the algorithm component 126 and may assist the algorithm component 126 in employing heuristics or other non-quantitative or non-statistical methods to make decisions about additional addressees to propose. Information found in rules and policies may be used by the algorithm component 126 to supplement or override statistical probabilities and other output received from the analysis component 124. Rules also may mandate the inclusion of some additional addressees in draft messages when the compliance component 128 detects the inclusion of certain predetermined addressees or sensitive or potentially harmful content in draft electronic mail messages.

The client devices 150, 160 may be electronic devices used to complete a variety of information processing tasks including the drafting, sending, and receiving of electronic mail messages. Client devices 150, 160 may connect with an electronic mail or other messaging application executing on a server (not shown) that may be dedicated to electronic mail processing. The client device 150, 160 may be one of a mobile telephone, a personal digital assistant (PDA), a media player, a tablet computer, a laptop computer, and a desktop computer. Client devices 150, 160 may execute an electronic mail client software application (not shown) comprising a plurality of electronic files and folders resident on the client devices 150, 160 that perform messaging tasks and also may perform calendaring, meeting and appointment request, contact management, and task management activities for the users of the client devices 150, 160.

The client components 152, 162 execute on the client devices 150, 160 and monitor the electronic mail activities of the client devices 150, 160, specifically the drafting of electronic mail messages. The client component 152 detects the instantiation of a draft message on a client device 150 and reports this event to the predictive addressing server 110. The client component 152 then detects the entry of addressees and other information into the draft message and reports the entries to the predictive addressing application 120. When the analysis component 124 completes its calculation of probabilities of proposed additional addresses for inclusion and the algorithm component 126 applies practices, thresholds, and policies to that output to make a final determination of what additional addresses should be proposed, the client component 152 receives the at least one listing of proposed additional addressees. The client component 152 presents the proposed addressees to the client device 150 in a pop-up box or dialogue box that provides the user the opportunity to select one group of proposed addressee with a single click of a pointing device or keystroke on a keyboard. The client device 150 also may be provided the opportunity to select individual addressees from within a group of proposed addressees. The client device 150 also has the opportunity to decline the insertion of any of the groups of proposed additional addressees presented. The client device 150 may receive no listings of proposed additional addressees if the predictive addressing application 120 finds no significant associations of electronic mail inputs.

The client components 152, 162 may be viewed as the "client portion" of the predictive addressing application 120 because the functionality of the client components 152, 162 is tightly integrated with that of the predictive addressing application 120. As a client device 150 is entering addressees and other information into a draft message, the client component 152 and the predictive addressing application 120 may engage in a rapid series of exchanges as the analysis component 124 and the algorithm component 126 may expeditiously process received information and send lists of proposed addressees back to the client component 152. Several iterations or cycles of information receipt, processing, and furnishing of proposed addresses may take place during the drafting of a single electronic mail message with the components of the predictive addressing application 120 providing more accurate and targeted lists of proposed addressees with each delivery of information received from the client component 152.

In an embodiment, the client components 152, 162 do not send every addressee and every text item entered into an electronic mail message by client components 152, 162 to the predictive addressing application 120. The client components 152, 162 may contain filtering software and components that enable the local selection of specific items of information for transmission. The components of the system 100 may have the capacity to learn the addressees and items of information entered into mail messages by client devices 150, 160 that are useful in determining lists of proposed addressees and learn addressees and other information that may be disregarded. Empirical data regarding the proposed addresses that have been previously accepted and rejected in previous situations and under what circumstances are taken into account by the client components 152, 162 and other components of the system 100.

The base transceiver station 170 may be any of cellular wireless base stations, for example a Code Division Multiple Access (CDMA), Global System for Mobile Communications (GSM), Universal Mobile Communications System (UMTS), and/or Long-term Evolution (LTE) cellular wireless base station, a World-wide Interoperable Microwave Access (WiMAX) base station, a WiFi access point, or other wireless access devices.

The network 180 promotes communication between the components of the system 100. The network 180 may be any communication network including a public data network (PDN), a public switched telephone network (PSTN), a private network, and/or a combination thereof.

The operations of the analysis component 124, in conducting database searching and calculating probabilities and those of the algorithm component 126 of applying policies and criteria, may be query-intensive on the messaging database 130 and rules database 140 as well as burdensome on server processing load. Such activities that might take place during the work day when electronic mail messages are being drafted may instead take place at alternate times when processing burden on database and messaging servers and network traffic may be light. In an embodiment, the analysis component 124 may perform many of its activities in advance of anticipated need. The analysis component 124 may access the message database 130 for the sent message history of the client device 150 during evenings or weekends when activity is reduced and perform analysis of associations of addressees and other sent message content during those times. By performing database querying and statistical analysis of sent electronic mail message history in advance, much of the processor and database query intensive work will be complete and ready for access when the client device 150 begins drafting an electronic mail message.

In an embodiment, some of the results generated in advance by the analysis component 124 may be provided to the client components 152, 162 executing on the client devices 150, 162 for local storage and processing. The analysis component 124 may on a regular basis, for example once per week, perform during off hours its analysis of historic electronic mail messaging activity by client devices 150, 160, and send the updates of the most current and statistically significant messaging activity on those devices to the client components 152, 162. When the client devices 150, 160 later begin drafting electronic mail messages, the client components 152, 162 could then combine the in-progress message composition with the recently updated pre-digested results provided by the analysis component 124. The client components 152, 162 may be able to locally determine possible addressees to propose to the client devices 150, 160 without engaging in an appreciable volume of transactional activity with the predictive messaging application 120 across the network 180. This arrangement may reduce burden on database and messaging servers, reduce network traffic, and provide faster service to client devices 150, 160.

Figure 2:
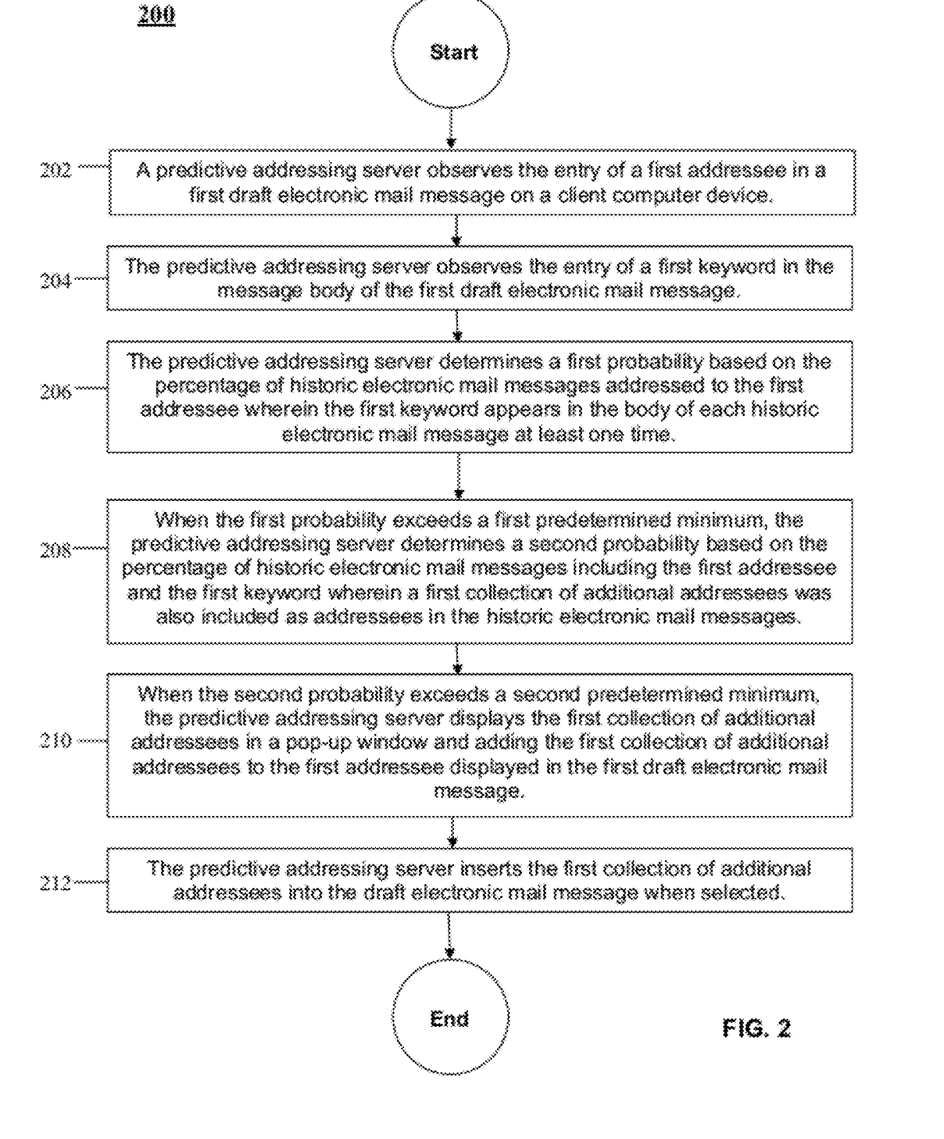
FIG. 2 is a flow chart illustrating a method according to an embodiment of the disclosure.

Turning now to FIG. 2, a method 200 of predictive electronic mail addressing is provided. Beginning at block 202, the predictive addressing server 110 observes the entry of a first addressee into a first draft electronic mail message on a client device 150. The communication component 122 of the predictive addressing application 120 receives a message from the client component 152 containing the addressee entered into the first draft electronic mail message.

At block 204, the predictive addressing server 110 observes the entry of a first keyword in the message body of the first draft electronic mail message. The client component 152, having advised of the entry of the first addressee at block 202, advises at block 204 that the client device 150 has entered an item of text or other object into the message body of the draft message. In an embodiment, the first keyword may be a problem record identifier, a project number, a product model number, or the serial number of a machine that is the subject of continuing discussion.

At block 206, predictive addressing server 110 determines a first probability based on the percentage of historic electronic mail messages sent to the first addressee wherein the first keyword appears in the message body of the historic messages at least one time. The analysis component 124 may determine that, for example, 80% of the messages that contain the first addressee also contain the first keyword in the message body. In the example, the first addressee may be the chief information officer named John Doe of a client company and the first keyword may be the name of a persistently failing server named Server1 that has been the subject of repeated electronic mail messages between client device 150 associated with a technical support function and the customer John Doe. In the example, specific additional addressees have also been included in both the primary To line and the Copy To line of the repeated historic messages sent to John Doe that included the character string Server1 in the message body. In an embodiment, while the first probability may be equivalent to the percentage calculated at block 206, it also may not be equivalent to the percentage, as the percentage may be subject to statistical manipulation and adjustment by the algorithm component 126 due to factors outside the scope of the analysis component 124. For purposes of discussion of the method 200, however, the first probability does equate to the percentage calculated at block 206.

At block 208, when the first probability exceeds a first predetermined minimum, the predictive addressing server 110 determines a second probability based on the percentage of historic electronic mail messages including the first addressee and the first keyword that also included a first collection of additional addressees. At block 206, the first probability was 80% and the first predetermined minimum, for example, was 75%, so in the example, the method 200 continues and the second probability is calculated. Had the first probability not exceeded the first predetermined minimum, the method 200 would have ended and other methods suggested by the present disclosure may have subsequently discovered and reported additional addressees and keywords and determined and suggested additional addressees.

Continuing at block 208, the analysis component 124 may discover that of the electronic mail messages addressed to the first addressee, John Doe in the example, that include the first keyword, Server1 in the example, a large portion also include two additional addressees. The two additional addressees may, for example, be named Tom Smith and Nancy Jones, who are respectively, the Vice President for Administration at the same company as John Doe, and the Global Account Manager at the company that manufactured Server1 and is attempting to provide support for Server1. Nancy Jones and the user of the client device 150 may work for the same company with Ms. Jones in a significantly senior capacity. Both Tom Smith and Nancy Jones may be construed as important parties in the ongoing matter involving Server1. The user of the client device 150, who in recent weeks has been sending a plurality of electronic mail messages to John Doe about Server1, very well may wish most or all of his or her messages sent to John Doe about Server1 to also include Tom Smith and Nancy Jones as additional addressees but may inadvertently forget to include one or both in a rushed situation. The user of the client device 150 also may be impacted by the limited user interface of the client device 150 wherein shortcut input may be helpful.

At block 208, the predictive addressing server 110 determines a second probability based on the percentage of electronic mail messages that include the first addressee and first keyword that also include first collection of additional addressees, Tom Smith and Nancy Jones. At block 208, the percentage is determined to be 90%. Of the messages sent by the client device 150 to the first addressee, John Doe, that included Server1 in the body of the message, 90% also included Tom Smith and Nancy Jones as additional addressees. In all likelihood, the user of client device 150 wants to include Mr. Smith and Ms. Jones on messages going to Mr. Doe that discuss Server1. In the method 200, the second probability is equivalent to the calculated percentage, 90%. As previously, the algorithm component 126 may apply factors to the calculated percentage that adjust the second probability up or down. The algorithm component 126 also has the capability to adjust predetermined minimums or thresholds that determined probabilities may need to meet or exceed.

At block 210, when the second probability, equivalent in the example discussed to the calculated percentage at block 208 of 90%, exceeds a second predetermined minimum, the predictive addressing server 110 displays the first collection of additional addressees on the client device 150. In the example, the second predetermined minimum is 85%. The second probability of 90% exceeds the second predetermined minimum of 85% and the first collection of additional addressees is displayed in a pop-up window proximate to the draft electronic mail message. The first collection of additional addressees may alternatively be displayed in a selectable shaded box or boxes beside or above the entered first addressee. In an embodiment, the selectable shaded box could be a floating checkbox wherein the suggested names appear "ghosted" with checkboxes next to them. The additional suggested addressees could appear inline or above the line wherein the user is making an entry. The user would then check the suggested boxes containing additional suggested addressees to have them activated and entered into the draft message. The client device 150 may have the option to selectively choose individuals named in the first collection of additional addressees, for example choosing to insert Nancy Jones but omit Tom Smith from a particular message.

At block 212, the predictive addressing server 110 inserts the first collection of additional addressees into the draft electronic mail message when selected by the user of the client device 150.

The method 200 described the need for probabilities to be calculated based on observed percentages and probabilities needing to exceed predetermined minimums to move to the next step of the method. At each point, the algorithm component 126 may use information drawn from the rules database 140 or other sources that it may use to adjust percentages upon which probabilities are based and adjust predetermined minimums that probabilities must meet or exceed. When, at particular steps, observed percentages and calculated probabilities do not meet minimums or standards needed to present potential additional addressees to the client device 150, the client component 152 may continue to send observed additional addressees, text, and other items observed to have been entered into a draft message to the predictive addressing server 110 for processing.

In an embodiment, if, in the method 200, after the observation of the entry of the first keyword following the observation of the first addressee, there had not been a notable frequency of additional addressees in historical sent electronic mail messages, the components of the system 100 may continue in their described activity. In an embodiment, the entry of a second keyword may be subsequently observed and after analysis, it may be determined that a second collection of additional addressees may be presented to the client device 150 for possible addition to the electronic mail message. With the second keyword, different percentages and predetermined minimum thresholds may apply. Different information in the rules database 140 also may apply. These may be described by additional methods and/or may be determined by the algorithm component 126. In an embodiment, the method 200 may predict email addressing based on any two data points selected from addressee data points, subject keyword data points, and body keyword data points.

Figure 3:
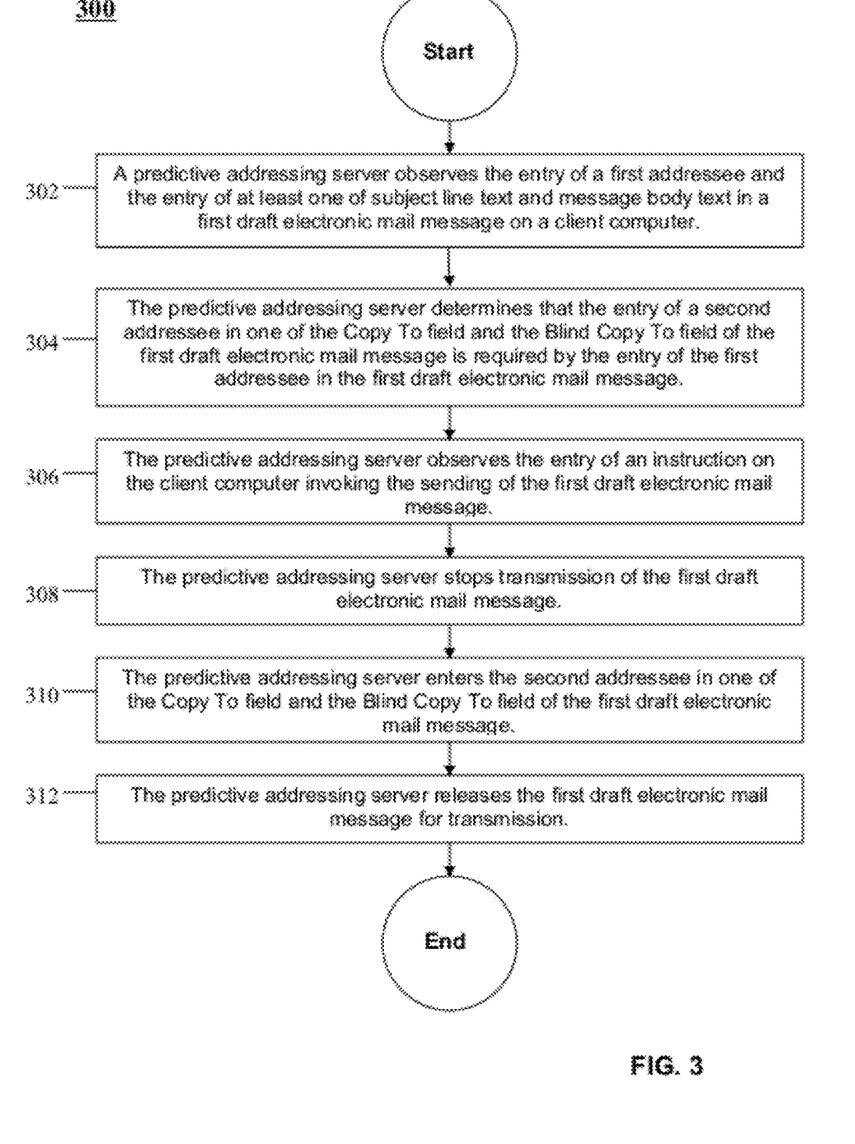
FIG. 3 is a flow chart illustrating another method according to an embodiment of the disclosure.

Turning now to FIG. 3, a method 300 of predictive electronic mail addressing is provided. Beginning at block 302, the predictive addressing server 110 observes the entry of a first addressee and the entry of at least text in the subject line and text in the message body of a first draft electronic mail message on the client device 150. The predictive addressing application 120 receives transmissions from the client component 152 advising that a draft message has been initiated on the client device 150. The transmissions also include the first addressee and the subject line or message body text entered into the draft message.

At block 304, the predictive addressing server 110 determines that the entry of a second addressee in one of the Copy To field and the Blind Copy To field of the draft electronic mail message is required. The compliance component 128 of the predictive addressing application 120 may have noted the entry of the first addressee, entered the first addressee into a search engine or accessed a policy from the rules database 140 that determined that a requirement is in place that mandates the insertion of the second addressee into the draft message when the first addressee has been inserted. A code may have been associated with the first addressee indicating that at least one certain additional addressee must be included in messages sent to the first addressee. In the example discussed in the method 200, a policy may require that Nancy Jones, the Global Account Manager for the manufacturer of Server1, be placed in either the Copy To or Blind Copy To sections of any electronic mail message in which John Doe, the chief information officer of the company using Server1, is an addressee. Compliance with this policy may be particularly important during the recent weeks when Server1 is having problems of a severity such that an official of Mr. Doe's seniority is always included as a recipient of messages involving Server1. Mr. Doe may insist on being advised of all developments in the resolution of the problem involving Server1 and Ms. Doe, as primary account representative to Mr. Doe's company, may wish to remain current on these developments.

At block 304, the predictive addressing server 110 observes the entry of the first addressee and locates a policy or otherwise determines that a rule is in effect requiring the second addressee to be included in electronic mail messages sent to the first addressee. At block 304, the predictive addressing server 110 does not insert any addressee into the draft message as the client device 150 is still in the process of drafting the message and may eventually add the second addressee as required. The predictive addressing server 110 at block 304 marks the draft message for later review pending completion by the client device 150.

At block 306, the predictive addressing server 110 observes that the client device 150 has entered an instruction to send the draft message and further observes that the client device 150 did not enter the second addressee as required by the policy. At block 308, the predictive addressing server 110 stops the transmission of the draft message and places the draft message in a temporary hold status until the policy requiring insertion of the second addressee can receive compliance.

At block 310, the predictive addressing server 110 enters the second addressee into one of the Copy To field and Blind Copy To field of the draft message as required by the policy. At block 312, the predictive addressing server 110 releases the draft message from its temporary hold status and permits it to be sent. In an embodiment, the draft message that did not include the required second addressee could be returned to the sender with a correction instruction directing the sender to add the required second addressee.

In an embodiment, much of the functionality taught by the present disclosure also may apply to meeting and appointment requests generated by a client device 150, 160. The process of selecting invitees, adding information in the subject line, and inserting text in the message body of the draft meeting or appointment request may be very similar to that taught in the method 200. The components of the predictive addressing application 120 along with the client components 150, 160 could in embodiments function similarly as they do in the method 200. The same also may be true for the actions of the method 300 wherein a the compliance component 128 may identify a policy that requires the inclusion of additional invitees to a meeting to which at least one of a first invitee was listed as an invitee and/or certain text appeared in the subject line or message body of the draft meeting request.

Figure 4:
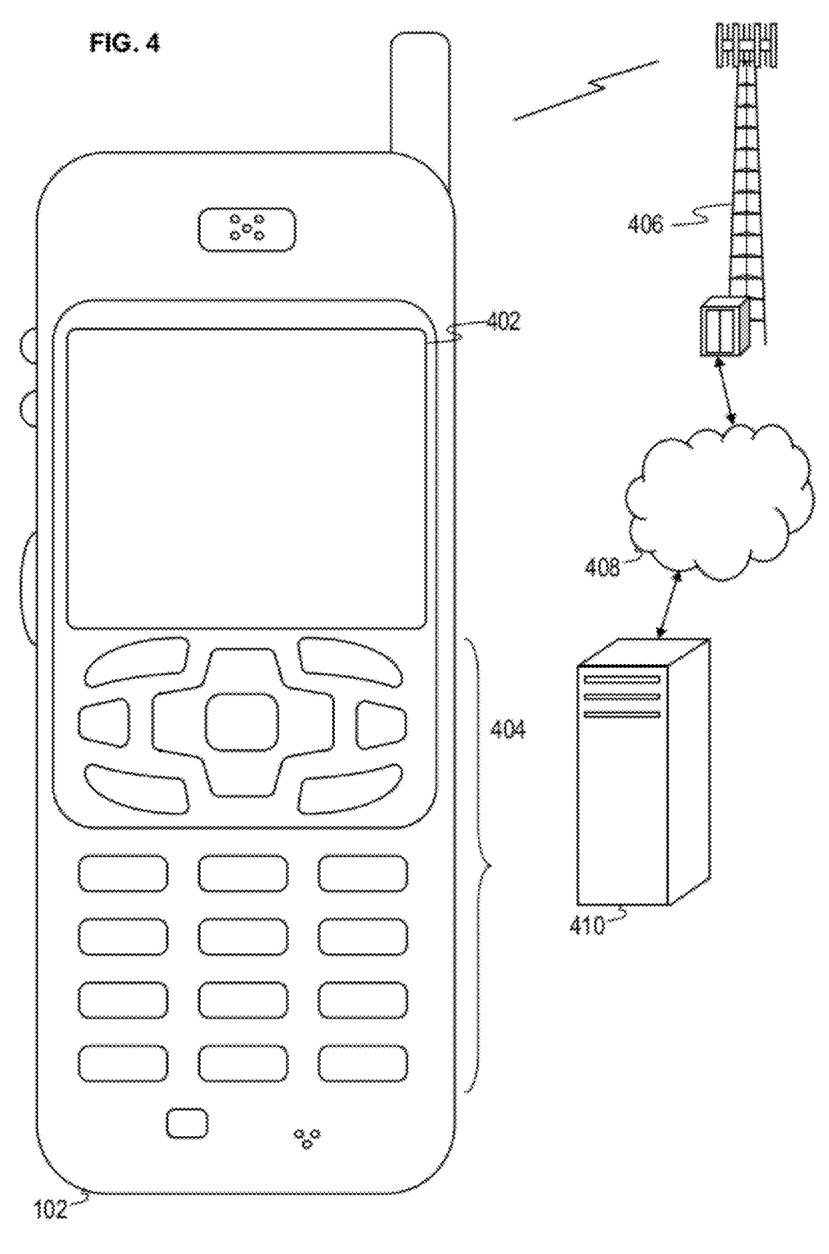
FIG. 4 is an illustration of a portable electronic device according to an embodiment of the disclosure.

FIG. 4 shows a wireless communications system including a portable electronic device 102. FIG. 4 depicts the portable electronic device 102, which is operable for implementing aspects of the present disclosure, but the present disclosure should not be limited to these implementations. The portable electronic device 102 may be an embodiment of the client device 150, 160 provided by the system 100. Though illustrated as a mobile phone, the portable electronic device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the portable electronic device 102 is not a general purpose computing device like a portable, laptop or tablet computer, but rather is a special-purpose communications device such as a mobile phone, wireless handset, pager, or PDA. The portable electronic device 102 may support specialized activities such as gaming, inventory control, job control, and/or task management functions, and so on.

The portable electronic device 102 includes a display 402 and a touch-sensitive surface or keys 404 for input by a user. The portable electronic device 102 may present options for the user to select, controls for the user to actuate, and/or cursors or other indicators for the user to direct. The portable electronic device 102 may further accept data entry from the user, including numbers to dial or various parameter values for configuring the operation of the handset. The portable electronic device 102 may further execute one or more software or firmware applications in response to user commands. These applications may configure the portable electronic device 102 to perform various customized functions in response to user interaction. Additionally, the portable electronic device 102 may be programmed and/or configured over-the-air, for example from a wireless base station, a wireless access point, or a peer portable electronic device 102.

The portable electronic device 102 may execute a web browser application which enables the display 402 to show a web page. The web page may be obtained via wireless communications with a base transceiver station (BTS) 406, a wireless network access node, a peer portable electronic device 102 or any other wireless communication network or system. While a single base transceiver station 406 is illustrated, it is understood that the wireless communication system may comprise additional base transceiver stations. In some instances, the portable electronic device 102 may be in communication with multiple base transceiver stations 406 at the same time. The base transceiver station 406 (or wireless network access node) is coupled to a wired network 408, such as the Internet. Via the wireless link and the wired network, the portable electronic device 102 has access to information on various servers, such as a server 410. The server 410 may provide content that may be shown on the display 402. Alternately, the portable electronic device 102 may access the base transceiver station 406 through a peer portable electronic device 102 acting as an intermediary, in a relay type or hop type of connection.

Figure 5:
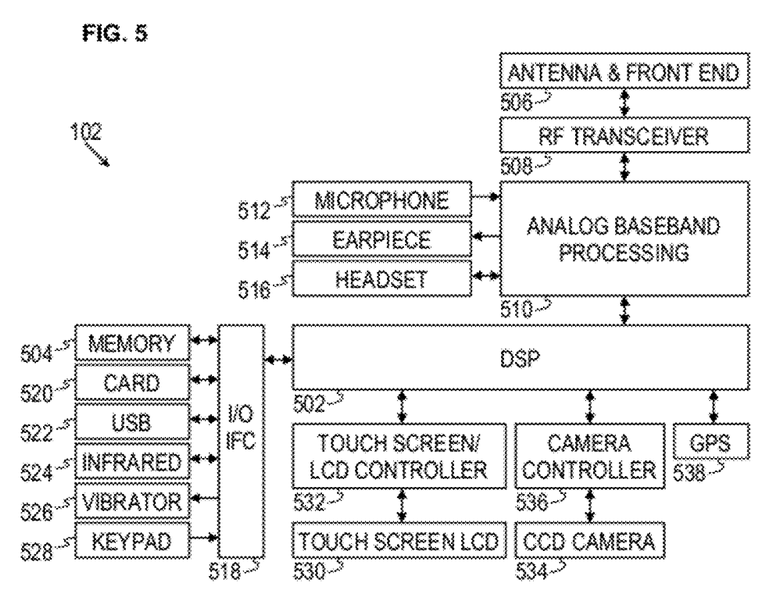
FIG. 5 is a block diagram of a portable electronic device according to an embodiment of the disclosure.

FIG. 5 shows a block diagram of a possible embodiment of the portable electronic device 102. While a variety of known components of the portable electronic device 102 are depicted, in an embodiment a subset of the listed components and/or additional components not listed may be included in the portable electronic device 102. The portable electronic device 102 includes a digital signal processor (DSP) 502 and a memory 504. As shown, the portable electronic device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the portable electronic device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the portable electronic device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the portable electronic device 102 to send and receive information from a radio access network (RAN) or some other available wireless communications network or from a peer portable electronic device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the portable electronic device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the portable electronic device 102 to function as a peripheral device to exchange information with a personal computer or other computer system. The infrared port 524 and other optional ports such as a Bluetooth interface or an IEEE 802.11 compliant wireless interface may enable the portable electronic device 102 to communicate wirelessly with other nearby handsets and/or wireless base stations.

The input/output interface 518 may further connect the DSP 502 to the vibrator 526 that, when triggered, causes the portable electronic device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the portable electronic device 102. Another input mechanism may be the touch screen LCD 530, which also may display text and/or graphics to the user. The touch screen LCD controller 532 couples the DSP 502 to the touch screen LCD 530.

The CCD camera 534 enables the portable electronic device 102 to take digital pictures. The DSP 502 communicates with the CCD camera 534 via the camera controller 536. The GPS sensor 538 is coupled to the DSP 502 to decode global positioning system signals, thereby enabling the portable electronic device 102 to determine its position. In another embodiment, a camera operating according to a technology other than charge coupled device cameras may be employed. Various other peripherals also may be included to provide additional functions, e.g., radio and television reception.

Figure 6:
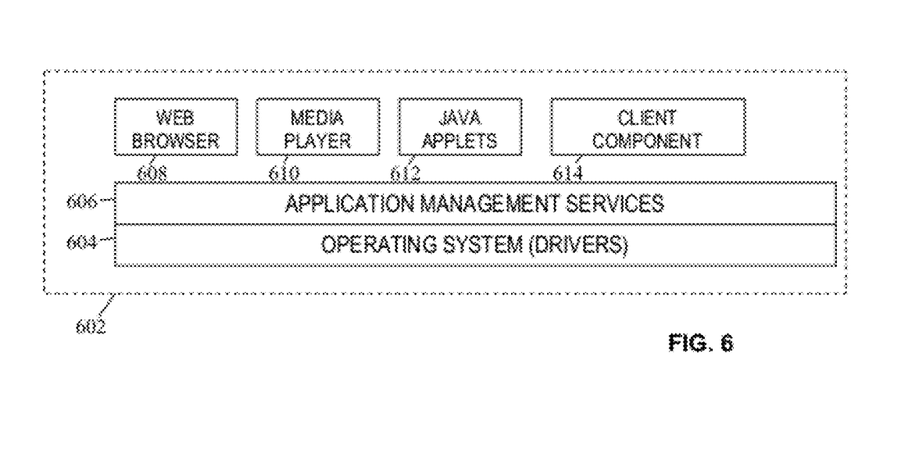
FIG. 6 is a block diagram of a software configuration for a portable electronic device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers

604 provide drivers for the handset hardware with standardized interfaces that are accessible to application software. The operating system drivers 604 include application management services ("AMS") 606 that transfer control between applications running on the portable electronic device 102. Also shown in FIG. 6 are a web browser application 608, a media player application 610, and JAVA applets 612. The web browser application 608 configures the portable electronic device 102 to operate as a web browser, allowing a user to enter information into forms and select links to retrieve and view web pages. The media player application 610 configures the portable electronic device 102 to retrieve and play audio or audiovisual media. The JAVA applets 612 configure the portable electronic device 102 to provide games, utilities, and other functionality. The client component 614 may be equivalent to the client component 152, 162 provided by the system 100.

Figure 7:
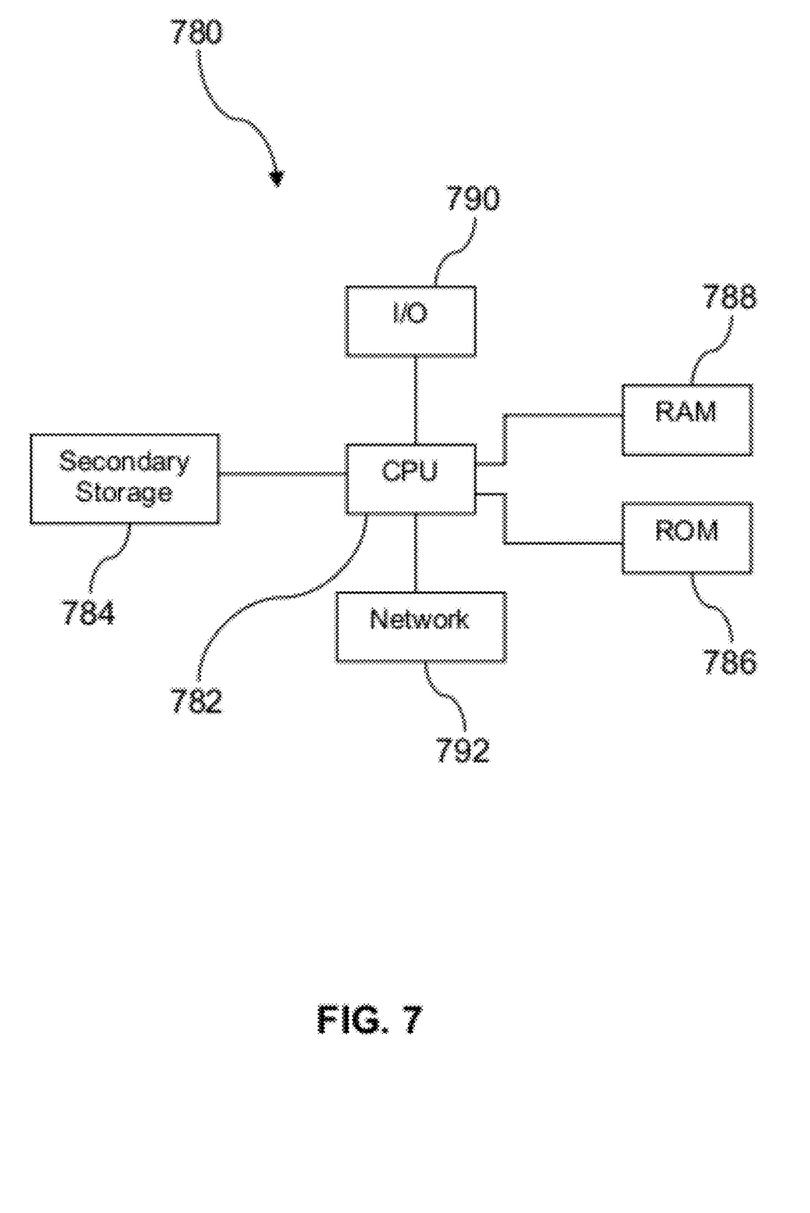
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for predictive electronic mail addressing, comprising:
    a computer system comprising a processor; and
    an application, that when executed by the processor on the computer system,
    observes an instantiation of a draft electronic mail message on a client device;
    observes an entry of a first addressee in the draft electronic mail message;
    observes an entry of a first keyword in a message body of the draft electronic mail message;
    determines a first probability calculated as a percentage of historic electronic mail messages addressed to the observed first addressee and including the observed first keyword in the body at least one time;
    determines, when the first probability exceeds a first predetermined minimum, a second probability calculated as a percentage of the historic electronic mail messages with the observed first addressee, and with the observed first keyword, and including a list of additional addressees as addressees;
    displays, when the second probability exceeds a second predetermined minimum, the list of additional addressees in a pop-up window that enables selectively adding the list of additional addressees to the first addressee displayed in the draft electronic mail message; and
    enters the list into an addressee entry space of the draft electronic mail message when selected from the pop-up window.

2. The system of claim 1, wherein the at least one list is identified based on analysis of an entry of a first addressee and analysis of at least one of an entry of a second addressee, an entry of text in the subject line, and an entry of text in the body of the draft electronic mail message.

3. The system of claim 1, further comprising a database aggregating historical combinations of addressees, subject line text blocks, and message body text blocks appearing in historical sent electronic mail messages, the combinations used by the application to create the at least one list.

4. The system of claim 3, wherein the application determines the probabilities of combinations of addressees, additional addressees, subject line text blocks, and message body text blocks appearing in historical sent electronic mail messages and wherein the application identifies at least one list further based on the probabilities.

5. The system of claim 1, wherein the client device is one of a mobile telephone, a personal digital assistant (PDA), a media player, a tablet computer, a laptop computer, and a desktop computer.

6. The system of claim 1, wherein all individual addressees contained in the list are selected for entry by the completion of one of a single keystroke on one of a keypad and keyboard and a click of a pointing device associated with the client device.

7. The system of claim 1, wherein the application further observes the instantiation of a draft meeting request on a client device, observes an entry of at least one invitee, identifies at least one list comprising additional proposed invitees, displays the at least one list in a selection pane on the client device, and enters the list comprising the additional invitees into the invitee entry space of the draft meeting request when selected.

8. A processor-implemented method for predictive electronic mail addressing, comprising:

observing, by a predictive addressing server, an entry of a first addressee in a first draft electronic mail message on a client computer;

observing, by the predictive addressing server, an entry of a first keyword in a message body of the first draft electronic mail message;

determining, by the predictive addressing server, a first probability calculated using a percentage of historic electronic mail messages addressed to the observed first addressee and including the observed first keyword in the message body at least one time;

when the first probability exceeds a first predetermined minimum, determining, by the predictive addressing server, a second probability calculated as a percentage of the historic electronic mail messages with the observed first addressee, and with the observed first keyword, and including a first collection of additional addressees as addressees;

when the second probability exceeds a second predetermined minimum, displaying, by the predictive addressing server, the first collection of additional addressees in a pop-up window that enables selectively adding the first collection of additional addressees to the first addressee displayed in the first draft electronic mail message; and inserting, by the predictive addressing server, the first collection of additional addressees when selected from the pop-up window.

9. The method of claim 8, further comprising:

observing, by the predictive addressing server, the entry of the first addressee in a second draft electronic mail message on the client computer;

observing, by the predictive addressing server, the entry of a second keyword in the subject line of the second draft electronic mail message;

determining, by the predictive addressing server, a third probability calculated as a percentage of the historic electronic mail messages addressed to the first addressee and including the second keyword in the subject line at least one time;

when the third probability exceeds a third predetermined minimum, determining, by the predictive addressing server, a fourth probability calculated as a percentage of the historic electronic mail messages with the first addressee, and with the second keyword, and including a second collection of additional addressees as addressees;

when the fourth probability exceeds a fourth predetermined minimum, displaying, by the predictive addressing server, the second collection of additional addressees in a pop-up window and providing a mechanism to add the second collection of additional addressees to the first addressee displayed in the second draft electronic mail message; and inserting, by the predictive addressing server, the second collection of additional addressees when selected.

10. The method of claim 8, wherein the first keyword and the second keywords are one of contiguous strings of alphanumeric characters, non-contiguous strings of alphanumeric characters, and a file embedded in the body of the first draft electronic mail message wherein the file displays an image in the first draft electronic mail message.

11. The method of claim 8, wherein historic electronic mail messages are defined as electronic mail messages sent within ninety days before the first draft electronic mail message is instantiated.

12. The method of claim 8, further comprising presenting, by the predictive addressing server, multiple collections of additional addressees in one pop-up window for review and providing a mechanism for one of selection of one collection of additional addressees for insertion and closure of the pop-up window without selection of one collection of additional addressees.

13. The method of claim 8, further comprising presenting, by the predictive addressing server, a third collection of additional addressees in a pop-up window and providing a mechanism to add the third collection of additional addressees to one of a Copy To line and a Blind Copy To line of the first draft electronic mail message.

14. The method of claim 8, wherein individual addressees contained in the first collection of additional addressees are individually selectable for addition to the first addressee.

* * * * *